(12) United States Patent
Eslambolchi et al.

(10) Patent No.: US 7,231,415 B1
(45) Date of Patent: Jun. 12, 2007

(54) METHOD AND SYSTEM FOR PROVISIONING FACILITY-BASED DISPLAYS IN SUPPORT OF REPAIRING OUTSIDE NETWORK FACILITIES

(75) Inventors: Hossein Eslambolchi, Los Altos Hills, CA (US); Bala Surya Siva Sri Gaddamanugu, Alpharetta, GA (US); Alexander Novokshanov, Alpharetta, GA (US); Harold Jeffrey Stewart, Alpharetta, GA (US)

(73) Assignee: AT&T Corp., Bedminster, NJ (US)

( * ) Notice: Subject to any disclaimer, the term of this patent is extended or adjusted under 35 U.S.C. 154(b) by 856 days.

(21) Appl. No.: 10/409,318

(22) Filed: Apr. 8, 2003

(51) Int. Cl.
*G06F 15/16* (2006.01)
(52) U.S. Cl. ...................... 709/200; 707/104
(58) Field of Classification Search ............... 370/249, 370/289, 241; 709/206, 200, 203, 224; 702/150; 715/500; 714/4; 705/7; 379/244; 725/37; 707/104
See application file for complete search history.

(56) References Cited

U.S. PATENT DOCUMENTS

| | | | | |
|---|---|---|---|---|
| 4,315,330 A | * | 2/1982 | Brickman et al. | 370/241 |
| 4,451,916 A | * | 5/1984 | Casper et al. | 714/4 |
| 5,343,461 A | * | 8/1994 | Barton et al. | 370/249 |
| 5,774,593 A | * | 6/1998 | Zick et al. | 382/236 |
| 5,920,846 A | * | 7/1999 | Storch et al. | 705/7 |
| 6,314,569 B1 | * | 11/2001 | Chernock et al. | 725/37 |
| 6,417,672 B1 | * | 7/2002 | Chong | 324/520 |
| 6,598,056 B1 | * | 7/2003 | Hull et al. | 707/104.1 |
| 6,631,481 B1 | * | 10/2003 | Hoard et al. | 714/41 |
| 6,748,340 B2 | * | 6/2004 | Otsuki et al. | 702/150 |
| 6,751,776 B1 | * | 6/2004 | Gong | 715/500.1 |
| 6,807,273 B2 | * | 10/2004 | Smith | 379/244 |
| 7,007,069 B2 | * | 2/2006 | Newman et al. | 709/206 |
| 2002/0138762 A1 | * | 9/2002 | Horne | 713/201 |
| 2003/0210686 A1 | * | 11/2003 | Terrell et al. | 370/389 |

OTHER PUBLICATIONS

Vision-based underwater cable detection and following using AUVs Arjuna Balasuriya; Ura, T.; Oceans '02 MTS/IEEE vol. 3, Oct. 29-31, 2002 pp. 1582-1587 vol. 3.*
Autonomous underwater vehicles for submarine cable inspection: experimental results Balasuriya, A.; Ura, T.; Systems, Man, and Cybernetics, 2001 IEEE International Conference on vol. 1, Oc. 7-10, 2001 pp. 377-382 vol. 1.*
Tracking Hands and Objects for an Intelligent Video..—Motoyuki Ozeki Masatsugu (2002) www.image.esys.tsukuba.ac.jp/html/yuichi/online-paper/ICPR2002-ozeki.pdf.gz.*

* cited by examiner

*Primary Examiner*—Thong Vu
(74) *Attorney, Agent, or Firm*—Michael Haynes PLC; Michael N. Haynes; Dale R. Jensen (57) ABSTRACT

The present invention provides a method and system for providing facility-based aerial displays to field personnel in support of repairing outside network facilities. The invention relates to a method and system for displaying a series of selected frames to generate a display of surroundings within the vicinity of a cable break. Frames are selected and manipulated in accordance with a significance level which accepts or rejects the frame and in accordance with a set of display parameters selected by a dispatcher. The aerial display is compiled and displayed to support the assessment of the surroundings to be encountered by a repair crew.

29 Claims, 5 Drawing Sheets

FLY-BY APPLICATION

CABLE: NJBED-202
IMAGE SIZE: 640 x 480
AUTOMATIC IMAGE POSITIONING: Y
INCLUDE REVERSE FLY AND LOOP: Y
SELECT CABLE SEGMENT: 7
STEP DISTANCE (MI): 1/1000
FRAME DELAY TIME: 250ms
FRAME DISPLAY FIXED VARIABLE: VAR
START SUB-SEGMENT: 100
END SUB-SEGMENT: 600
FLY FROM (MI): 0
FLY TO (MI): -1
SIGNIFICANCE LEVEL: 5 (0-10)
NUMBER SUB-FRAMES: 4
MARK POINT (MI): 2,345 FEET

[ PLAY FRAMES ]

FIG. 5

METHOD AND SYSTEM FOR PROVISIONING FACILITY-BASED DISPLAYS IN SUPPORT OF REPAIRING OUTSIDE NETWORK FACILITIES

FIELD OF THE INVENTION

The disclosed invention broadly relates to a display-based support tool for use in the restoration of outside plant facilities by displaying existing three-dimensional structures and associated network components and facilities.

BACKGROUND OF THE INVENTION

The integrity of the public switched telephone network and related network based facilities is an issue of increasing concern to the public at large and to the telecommunications industry—particularly in the wake of recent network failures occurring in the United States, such as the fire that occurred at a local exchange in Chicago in May 1998 which caused the loss of telecommunications services to over 35,000 residential telephone, 37,000 trunks, and over 118,000 long-distance fiber optic circuits. Concern over network integrity has also been heightened by the ever increasing costs associated with the replacement of telecommunications equipment and the labor-intensive costs of deploying a repair and restoration work force to an affected site. Accordingly, telecommunication services providers are becoming more attentive to assessing and developing new ways to minimize service outages by preventing damage to existing facilities, finding alternative means of routing traffic and expediting the repair and restoration process.

Telecommunication services providers such as AT&T and other local and long-distance carriers maintain an extensive network of copper-based, coaxial, and fiber optic cables to carry the nation's telecommunications traffic. Despite the care given to protect and maintain these cables, such cables can and do sustain damage. These cables are damaged for a number of reasons, ranging from acts of nature, in the form of floods, fires and earthquakes, to contractor mistake or carelessness in severing cables during excavation. Regardless of the cause of the damage, service disruption can have an immediate and lasting effect on the businesses that depend upon such services. Moreover, a service disruption may also have significant financial consequences on the service providers. More specifically, service providers face the prospect of significant loss of revenue as well as and perhaps most importantly, a loss of goodwill in its ability to provide and maintain quality, reliable and survivable services. To minimize such financial and perceptual damage to the service providers, a rapid and reliable restoration plan and process must be in place.

Present-day outside plant cables are monitored by various systems that are capable of detecting the disruption of traffic on a cable-by-cable basis. Upon detection of a broken or damaged cable, a dispatcher will dispatch one or more field technicians to the location of the break to perform a preliminary assessment of the site and to conduct the necessary repairs. However, the mere detection of a break in a cable or the fixation of the location of the break on a cable is often insufficient to assess the magnitude and degree of effort necessary to restore service. Often, cables are buried or hidden from view by natural and made—made structures such as trees, poles, apartment buildings, sewer ducts, bridges and roadside guardrails and passageways.

To facilitate a damage assessment and the extent of the repair effort necessary, the dispatcher must first assemble a team of field inspectors to assess the extent of the damage and potential obstacles in the way of repair and restoration. This first stage of assessment is rather inefficient in that it relies heavily on the assessment of cable damage by field personnel that may not have the best vantage point from which to assess the damage. Often, field personnel are only provided with a location and an identified cable or cables and related equipment that have been detected as the source of the problem. Under these circumstances, field personnel are often unable to fully appreciate the routing of damaged cables, the location of related equipment that must be replaced or tested, and the alternative solutions to the problem. Accordingly, there is a need for a method and system which would inform the dispatcher and the assigned field personnel of the terrain, cable routing, and related equipment associated with or within the immediate vicinity of the damaged cables or equipment. In particular, there is a need for the provisioning of structural and up-to-date mapping information about the routing of the affected cables and related equipment. Moreover, the mapping and display information is necessary to facilitate the advanced assessment of the potential damage and the effort necessary to repair and restore service.

SUMMARY

The present invention provides a method and system for providing facility-based displays to field personnel in support of repairing outside network facilities. The advantages of the present invention are provided by a method and system whereby, upon the detection of a break in a cable, a series of frames may be compiled which are associated with a direction of travel and with segments or markings within the vicinity of a cable break and which may be selected to display a level of detail useful in assessing the surroundings in which a field crew will conduct repairs. The frames are selected in accordance with an algorithm which discriminates between levels of significance on a frame-by-frame or sub-frame-by-sub-frame basis so as to eliminate repetitive or insignificant details that are unnecessary to the assessment of the work to be undertaken. In accordance with the invention, the location of the cable break or failure is detected and used to select an aerial or fly-by display of the surroundings within the vicinity of the cable break. An animated aerial display of the selected area is compiled in accordance with an algorithm which accepts or rejects a frame indexed to a sub-segment within a selected range of sub-segments of an affected area.

BRIEF DESCRIPTION OF THE DRAWINGS

These and other features of the present invention will best be understood by reference to the following brief description of a preferred embodiment of the invention, taken in conjunction with accompanying drawings, in which.

DETAILED DESCRIPTION

The present invention generally relates to a method and system for providing a network-based fly-by view or display of a cable break to a dispatcher and field personnel. Although the present invention is described in the context of responding to an emergency situation whereby loss of service has affected a myriad of customers, it has broader applications. In particular, the invention may be useful in other endeavors, wherein fly-by views or displays and mapping-related information is necessary to carry out damage-based inspection and repair, such as oil and gas pipeline facilities and other plant-based facility inspections.

Figure 1:
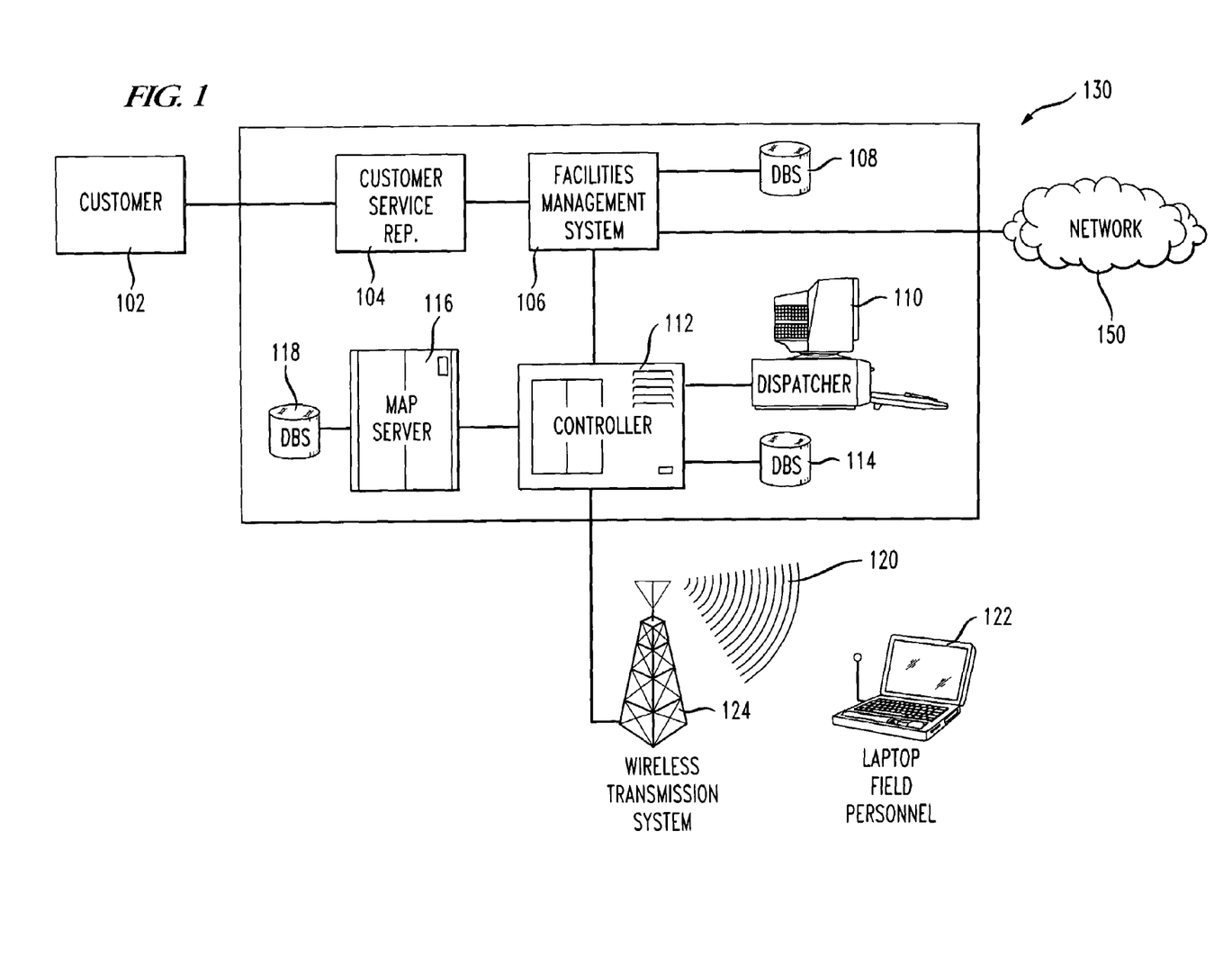
FIG. 1 illustrates a functional block diagram of an emergency response system in communication with field personnel.

FIG. 1 illustrates a functional block diagram of an emergency response system ("ERS") 130 used to report, assess, and locate cable breaks in a communications network and to issue work orders to outside field personnel. In the event of a break in a cable in the communications system, a customer 102 places a call to a customer services representative 104 at the emergency response center via an "8xx" toll free number to report a loss of service. The CSR 104 takes all relevant information about the loss of service, including time of outage, services affected, location of affected areas, and all other relevant information that may be useful in determining and isolating the cause of the service outage. The collected data is entered and stored in the database 108 of the facilities management system 106. The facilities management system 106 ("FMS") comprises one or more processors or computers having access to a database 108 containing records of all network-based facilities, such as cables, and related equipment such as repeaters and power stations. In addition, FMS 106 comprises facilities management software used to modify and correlate facility records as well as to manage and generate network-based trouble tickets and plant-based aerial displays. Although notification of a service outage may be initiated by a customer 102, most state of the art network management systems currently employ and primarily rely on the use of a network based monitoring system to provide notification of a break in the network. Regardless of the means of notification, a break notification is generated by the facilities management system 106 and is immediately forwarded to the dispatcher at the ERS 130 for immediate response. The break notification is a summary of the data taken by the CSR 104 as well other relevant data acquired about the facilities involved and stored in an FMS database 108. In processing the break notice, the resident software at the FMS 106 correlates the customer, location and the services involved with the specific facilities associated with the affected sites and services.

As shown in FIG. 1, the field dispatcher is in direct communications with the FMS 106. In the event of a cable break, the field dispatcher is immediately notified of the break via a dispatch terminal 110. In accordance with the facilities management software, the break notice is displayed on dispatch terminal 110 with an associated two-dimensional map of the suspected site of the break in a cable or the failure of associated equipment. The map is fetched from map server 116 at the request of controller 112 which is responsible for the controlling and processing of repair instructions and related information to field personnel. Controller 112 comprises one or more processors and associated databases 114 and contains operating and application software necessary for interacting with map server 116 and FMS 106. In particular, controller 112 contains map display and animation compiling and building software capable of selectively sequencing selected frames to create a display file. Logistically, once data about a cable break or failure is compiled and finalized, the FMS 106 initiates a set of queries to the controller 112 to provide mapping data which can be used to better analyze the cause of the problem and to determine remedial alternatives. Based on the data provided by the FMS 106, the controller 112 queries map server 116 for a map of the relative position of the affected cables and associated equipment. In order to communicate with the map server 116 and to specify the particular geographic areas of interest, the controller 112 converts location data used in the FMS 106 to compile facility data into geocodes which designate specific portions of map data. Geocodes are mnemonic map codes assigned to represent specific areas of a map. The geocodes submitted to the controller are forwarded to the map server 116 and are used to retrieve data stored under the designated geocodes. As alternative positioning data, the FMS 106 may also provide longitudinal and latitudinal data to designate specific map areas of particular interest.

Based on the location data provided to the map server 116, a corresponding two dimensional geographic bitmapped file is forwarded to the FMS 106 through controller 112. The dispatcher analyzes the data fetched by the FMS 106 relating to the break notification as well as the bitmapped file fetched by the map server 116. In order to ascertain the location of the cable break or the point of equipment failure, the FMS 106 initiates a test to confirm the suspected point of break or failure 205 (as shown on FIG. 2). The dispatcher initiates a command to the FMS 106 to send out a test signal from a piece of test equipment within a known point on the network or from at least one of the termination sites of the cable suspected of failure. Depending on the type of cable suspected of the break, the transmitted test signal may be that of an electrical or optical test signal. These test signals are sent to ascertain the approximate location of the cable break or failure. As is known in the art, time domain reflectometer tests of this nature are sent with the understanding that, by measuring the time delay in a reflected signal (electrical or optical), the distance can be calculated if the speed of propagation and the time of travel of the reflected signal are known. The FMS 106 initiates a downstream command to initiate a test signal from a test point within the network such as from a point-of-presence (POP) at an end office or test equipment installed on the network for testing purposes. Preferably, the tests are conducted from more than one location such as both termination points or from multiple test points within the network. The measurements taken by these test POPs are sent back to the FMS 106 and are, in accordance with an algorithm, at the FMS 106, used to locate the approximate position of the cable break or failure 205. The algorithm used to locate the break point or failure is preferably based on prior experience and the historical reliability of measurements taken from any test POP. Once the FMS 106 has ascertained the approximate location of the break or failure, the dispatcher must determine the remedial course of action and transmit a work order to field personnel via wireless transmission system 124. More specifically, a signal 120 is transmitted by wireless transmission system 124 for receipt by laptop 122. To aid the dispatcher in an initial assessment, the cable break or failure 205 is graphically and automatically presented on the initial two-dimensional map by the controller 112. However, full assessment of the cause of the cable break or failure cannot be completed without a comprehensive assessment of the environment surrounding the suspect location of the cable break or failure 205. In accordance with the invention, an aerial view or fly-by inspection of the cable break will provide the added information necessary to complete a full assessment.

Figure 2:
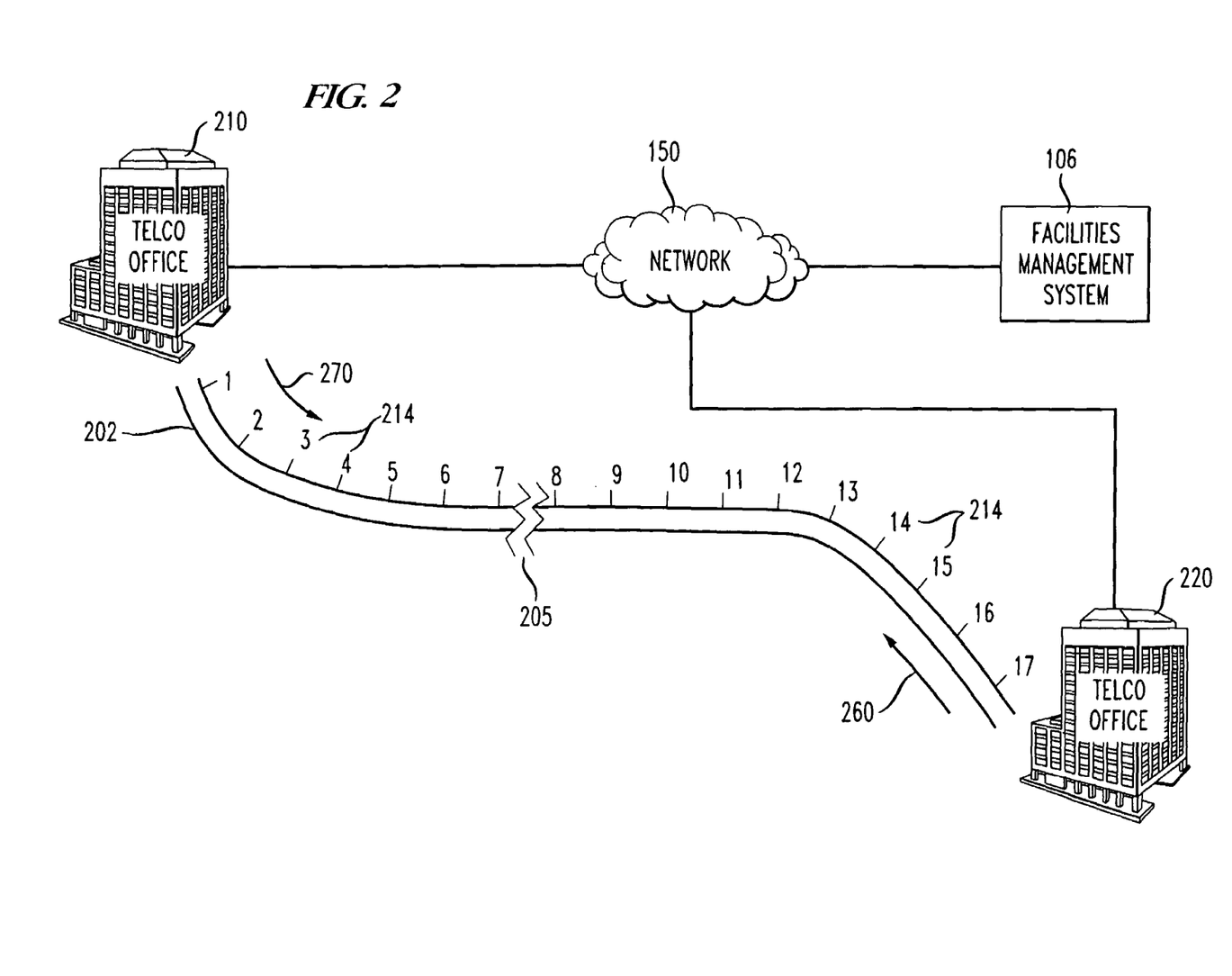
FIG. 2 illustrates a segmentation of an optical cable and a cable break between two terminating sites within a communications network.

As shown in FIG. 2, a cable 202 terminated at Telco end offices 210 and 220 has been identified as the source of the reported service failure. However, before the dispatcher can alert and assign a work crew to make the necessary repairs, a more precise localization of the cable break and evaluation of the possible causes of the problem must be made. As discussed above, the FMS 106 in communication with the telecommunications network 150 initiates a series of test commands to isolate the location of the break. For purposes of illustration, the cable 202 is a fiber optics cable handling dedicated traffic between two termination points (not shown) serviced by two Telco end offices 210 and 220. To localize the cable break or failure 205, an optical domain reflectometer (OTDR) transmits an optical pulse into fiber optic cable 202 and measures the corresponding reflection from this optical pulse. Reflection of the pulse energy is symptomatic of transmission irregularities and may be caused by a variety of factors such as cable connections, splices or, more importantly, the backscattering of pulse (light) energy due to the existence of a break in the cable. The OTDR detects the reflected optical signal and interprets the characteristics of backscattered or reflected pulses to identify the locations of cable connectors, splices and cable breaks. The OTDR at the Telco end office interprets the location of the cable break based on the reflected signal. The calculated distance of the cable break from an end office 210, 220 is reported back to the FMS 106 via the network 150. It should be understood that, in addition to localizing the location of the break, the tests conducted on optical cable 202, may also yield information about the condition of the entire optical cable 202 such as the connectors and splices. Such additional information may be used by the dispatcher to assess whether, in addition to repairing the cable break, other cable connectors and/or splices should be also be replaced.

To further enhance the accuracy of the location of the break, the FMS 106 may also initiate testing of the optical cable from both terminating end office locations 210, 220 or from points on the optical cable 202 which are still operational. As shown in FIG. 2, optical test signals 270 and 260 are introduced from both terminating end offices 210, 220. The distance data received from the end offices 210, 220 or other in-link test points may be averaged or may be used in accordance with an algorithm used to locate the break point or failure. The algorithm, however, is preferably one based on prior experience and/or historical reliability of measurements taken from a specific test point.

Once the distance data has been ascertained within a reasonable degree of certainty, the FMS 106 correlates the distance data with known distance markers 214 shown in FIG. 2. These distance markers (1–17) 214 are internal network and cable reference points used to divide the optical cable into cable segments and to denote the approximate distances from a point of origin and from other cable segments. Each cable segment is divided further into sub-segments to provide a higher resolution of relative cable positioning. The importance of cable segmentation is the association between a cable segment and sub-segments to associated data stored in the FMS 106 (database 108). In accordance with the present invention, each segment and sub-segment (collectively markers) are stored, indexed and associated with network facilities associated with corresponding cable markers. The sub-segments are preferably designated at relative uniform lengths from one another, although non-uniform sub-segments may be used to designate the specific locations of network-based facilities.

Figure 3:
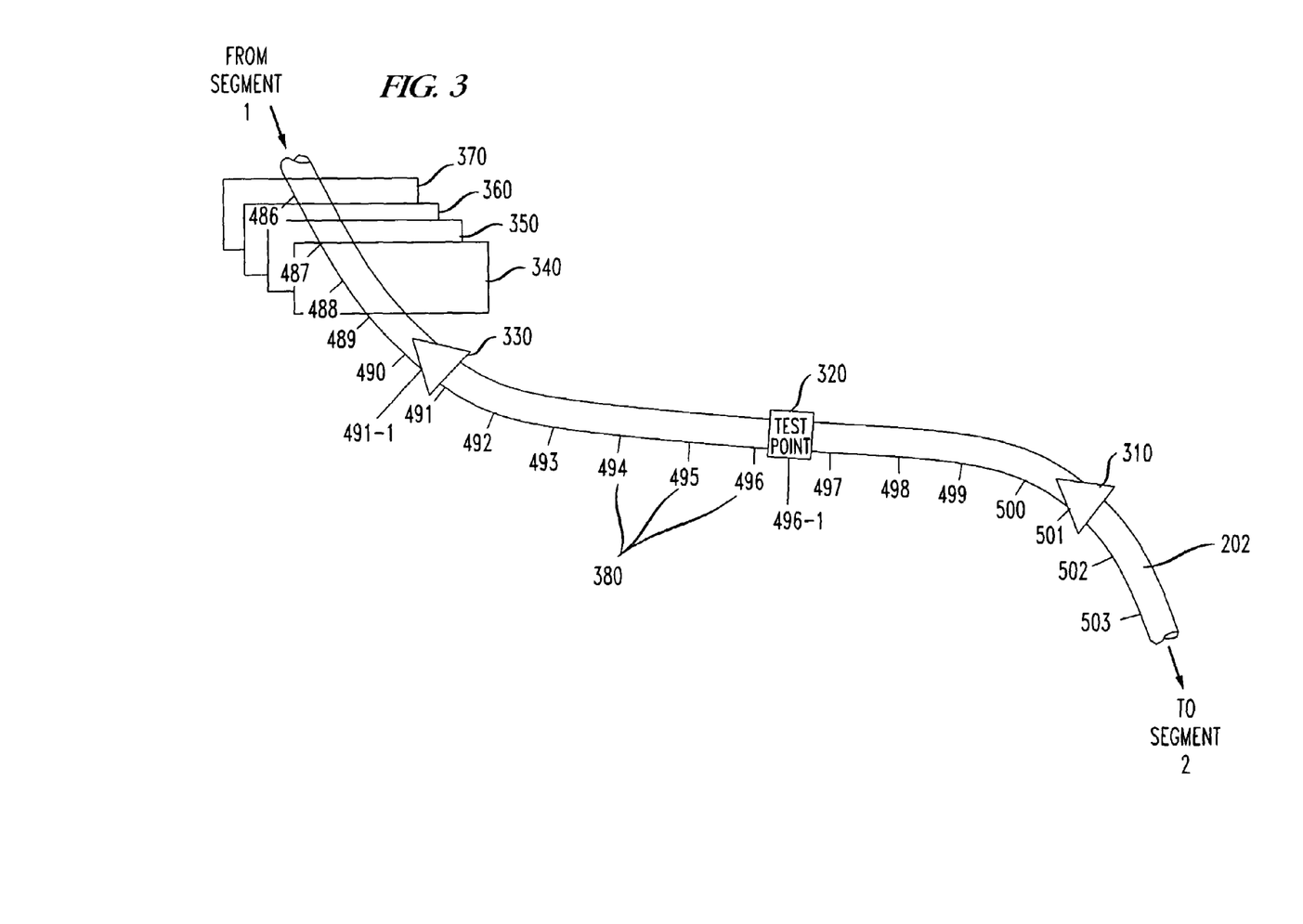
FIG. 3 illustrates the sub-segmentation sequence of the optical cable and a cable break between segments 1 and 2 and associated equipment.

As shown in FIG. 3, a portion of optical cable 202 is shown between segments 1 and 2 and within the range of sub-segments 486–503. Network based facilities populate the length of optical cable 202 along its length between segments 1 and 2. Cable connection 320 and repeaters 330 and 310 are shown at non-uniform and uniform sub-segments 496-1, 491-1 and at 501. These sub-segments are stored, indexed, and associated with certain network-based facilities such as repeaters 330, 310 and cable connection 320. However, in addition to the indexing of facilities with segments and sub-segments, the FMS 106 stores associated map files with each designated segment and sub-segment 380. As shown in FIG. 3, each of these map files are representative three-dimensional frames 340, 350, 360, 370 of the environmental surroundings of the optical cable 202. These frames 340–370 are preferably three-dimensional snap shots of below-ground, above-ground or a combination of both, and are used to provide the dispatcher a fly-by view of the terrain and associated facilities along the path of optical cable 202.

The frames 340–370 may be created and stored in a myriad of formats and display protocols, including the formatting and storage of these frames 340–370 as bit-mapped, tiff, gif, jpeg, mpeg and vector-based image frames. Moreover, these frames may be computer-generated frames resulting from field surveys where lengths and environmental structures have been inspected, reported and entered into the map server 116. Alternatively, the frames may be the result of images provided by aerial photography, global positioning system (GPS) and geographic information system (GIS) information which may be used to create frames associated with each segment and sub-segment. Upon request by the dispatcher, these frames may be organized to create a sequence of displayed frames along the length of the optical cable 202 to produce a moving or fly-by display of the surroundings of the cable within any designated segment or sub-segments. The frames may include buildings, roads, telephone poles, below-ground repeaters, power stations, test points and the like. In effect, the display provides the dispatcher the advanced knowledge of the natural and man-made structures and associated network equipment that may be involved in the subsequent repair efforts to be undertaken by a field crew.

Figure 4:
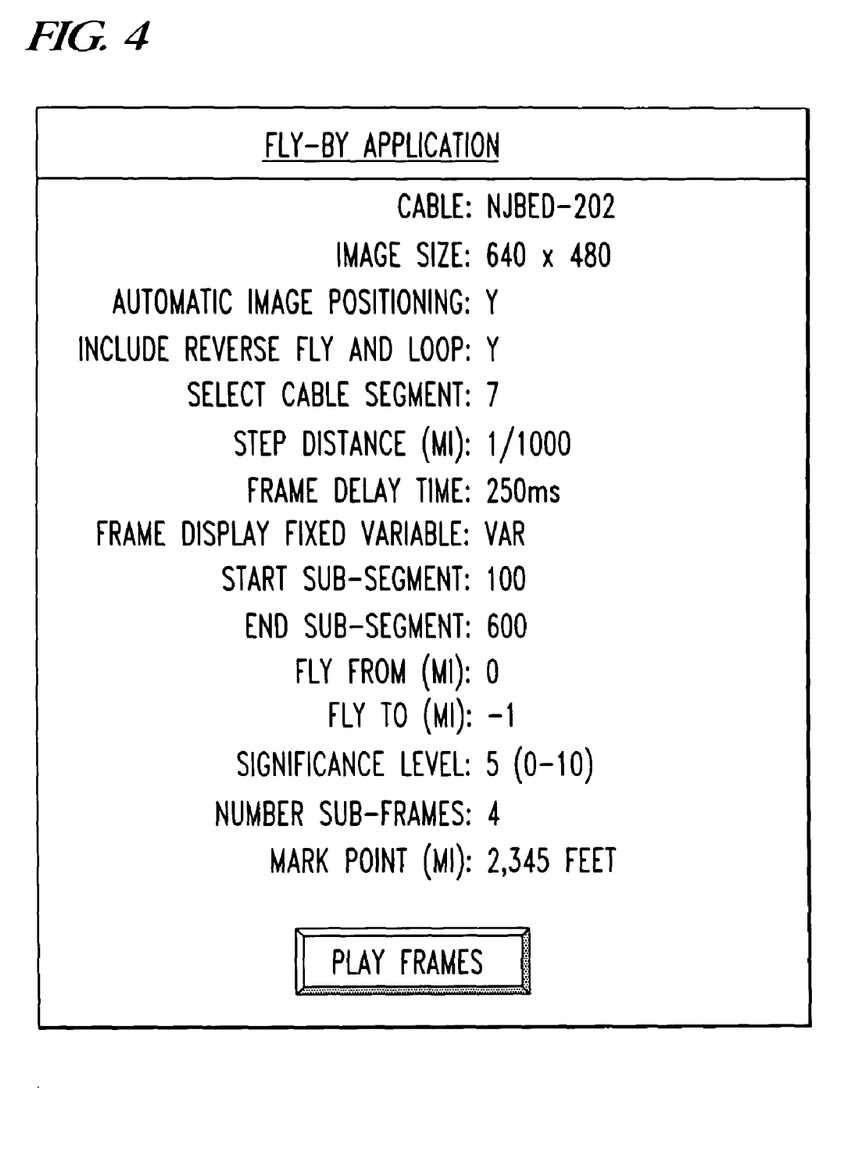
FIG. 4 illustrates a set of selectable parameters used in the creation of a display along the path of the optical cable.

Although the display of these frames to obtain a fly-by or aerial view of the location of the break or failure 205 can be automatically generated upon the determination by the FMS 106 of the segments and sub-segments within the vicinity of the break 205, the FMS 106 and associated software and database permits the customization of a fly-by view or display over the site of the cable break or failure 205. As shown in FIG. 4, a dispatcher may, in accordance with the screen display of the fly-by application, select the manner in which the frames along cable 202 and within the affected segment may be displayed. In the example shown in FIG. 4, the identity of the cable ("NJBED-202") is entered, followed by specific display parameters such as: the image size of the display (x,y in pixels); automatic and centralized image positioning on the screen; whether the fly-by display should include a reverse fly-back loop/display of the frames from the opposite direction; the identity of the cable segment(s) to be displayed or affected by the outage; the step distance between two consecutive frames (unless equipment is present in the interval between step distances); the time delay between each frame; whether the frames must be displayed at fixed sub-segments or may be variable according to an encounter with network facilities; the start and end sub-segments within the area of interest; the span of the display from the starting point to an end point; and the mark point or the location of the cable break of failure.

Most of the data is pre-determined by the FMS 106 to provide the best view of the site of the break 205. However, parameter-selectable options are provided to allow the dispatcher to focus on views and positioning data that may be of particular interest to the site of the break 205 and to the dispatcher. Once the dispatcher has selected the display parameters, the dispatcher issues a command for the FMS 106 to fetch and compile a series of frame displays that will sequentially simulate the appearance of a fly-by view over the anticipated site of the cable break or failure 205. More specifically, the FMS 106 initiates a set of queries to the controller 112 responsible for field communications to access and query the map server 116 to fetch all image files in accordance with the selected display parameters, which are associated with optical cable 202 and fall within the selected segments and sub-segments. The map server 116 fetches these files and forwards them to the controller 112, where they are stored in database 114 for subsequent use and distribution by the controller 112 through landlines or wireless means such as wireless transmission system 124 to field personnel. The controller 112 accepts the series of frames and through the use of animation-building software conducts map file manipulation, selection and layer. For example, controller 112 selects the frames associated with the sub-segments 100 to 600 in optical cable NJBED-202. However, each frame is not necessary for the production of the display unless, the frames fulfill the selection criteria entered in FIG. 4 and add visual information to the display. The frame parameters were selected in accordance with FIG. 4, at a step distance of $\frac{1}{1000}$ of a mile or approximately at 6-foot distance intervals and at a display rate of about 250 ms or $\frac{1}{4}$ of a second. However, the likelihood is that each frame stored in the controller's database 114 within the 100 to 600 sub-segment range will not yield any additional and meaningful information for the dispatcher. Accordingly, the present invention utilizes a selection algorithm wherein frames and/or sub-frames are compared for the additional information or differences in the level of detail or information provided in the next frame or corresponding sub-frame. For purposes of illustration, the following discussion will reference a comparison of corresponding sub-frames. However it should be understood that the process is also applicable to the comparison of frames with or without partition.

A frame is partitioned into two or more sub-frames, and the data within each of the sub-frames of a first frame is compared to a corresponding sub-frame of a second frame. In the event that a comparison of two corresponding sub-frames from a first and second frame, for example, demonstrates a significant difference (as determined by the dispatcher or controller) between the data provided in the corresponding sub-frames, the controller 112 will select the second frame for inclusion in the frame sequence, provided that the display parameters selected by the dispatcher in FIG. 4 are also fulfilled. If there is no significant difference between the corresponding sub-frame in first frame and a corresponding sub-frame in a second frame, the controller 112 may simply skip the second frame and conduct a comparison of the corresponding sub-frame in the first frame with a corresponding sub-frame in a third sequential frame and thereafter repeat the comparison process. It should be understood, however, that the parameters selected by the dispatcher should generally be fulfilled. If, for example, a next in sequence frame provides no significant additional information but the selected display parameters indicate a step distance of $\frac{1}{1000}$ (approx. 6 feet), the controller 112 will redisplay within the selected frame display time of 250 ms a repeat of the display of the current frame. In this manner, reproduction of display data which provides no further significant information about the surrounds along the length of the optical cable 202 is neither stored nor processed for display. The level of significance for purposes of frame selection is a relative selection based on a significance scale selectable by the dispatcher. As shown in FIG. 4, a significance level scale parameter is available to the dispatcher for selecting or filtering the level of detail or resolution about the frames selected. Each frame within the 100–600 sub-segments and each sub-frame within a frame are tagged with significance level markers which denote the relative difference in detail between a frame and a preceding frame or a corresponding sub-frame in a frame and a preceding sub-frame. For ease of clarity, the following discussion will focus on the significance levels of frames, although it should be understood that it shall also apply to sub-frames.

If the level of detail or significance is below the designated significance level, the next frame is ignored. However, the next selectable frame within the sequence of frames along optical cable 202 and sub-segments 100–600 is then compared and a significance level difference determined. The significance level, however, must now also take into consideration the effect of having skipped an intermediate frame. For example, if the significance level between a first and second and adjacent frames (frames 1 and 2) in the sequence of 100–600 sub-segments is designated a "2", and the selected significance level is 5, frame 2 will be discarded. The process is then repeated whereby frame 3 is marked with a significance level marker of "3". The significance level marker of "3" is a comparison of frame 2 and frame 3 and does not include or reflect a significance level difference between frame 1 and 3. To give weight to such a significance difference, the significance level of "3" between frame 2 and 3 is added to the significance level difference between frame 1 and 2 (a significance level of "2") to arrive at a significance difference of 5, which in accordance with the selected display parameters selected by the dispatcher would require that frame 3 be included in the display sequence.

Wherein a frame is partitioned into sub-frames and each sub-frame is given a significance level difference or marker, the above significance level marker comparison process may likewise be applied on a frame-by-frame and corresponding sub-frame to corresponding sub-frame basis. The display of frames will in accordance with the above process result in one or more of the following selection algorithms. On a frame-by-frame comparison, a frame having a significance level equal to or greater than the selected significance level as determined by a comparison between a reference frame (frame 1) and a next frame (frame 2) or subsequent frames (frame 3,4, etc.) will be selected as discussed above. Alternatively, on a sub-frame to corresponding sub-frame comparison, a sub-frame having a significance level equal to or greater than the selected significance level as determined by a comparison between a reference sub-frame of a frame 1 and a next corresponding sub-frame of a frame 2 or subsequent corresponding sub-frame of subsequent frames 3, 4 etc. will be selected by determining the significance level difference between corresponding sub-frames as discussed above with regard to the frame-by-frame comparison. Moreover, the selection process may further combine the selection process to provide a frame selection that incorporates an "and" or "or" condition to the above selection process. A frame may be selected if either or both of the frame and sub-frame significance levels are met. Alternatively, and in the event that a sub-frame significance level is met, the portion of the sub-frame which meets the significance threshold may be displayed while the other sub-frames within the frame may be discarded. Under such circumstances, the selected sub-frame is in effect carved out of the frame and superimposed on the current frame. Despite the selection process used, the controller 112 compiles a map file consisting of selected frames in accordance with the direction of travel of the display, the selected significance level, and the other chosen parameters selected by the dispatcher as shown in FIG. 4.

Figure 5:
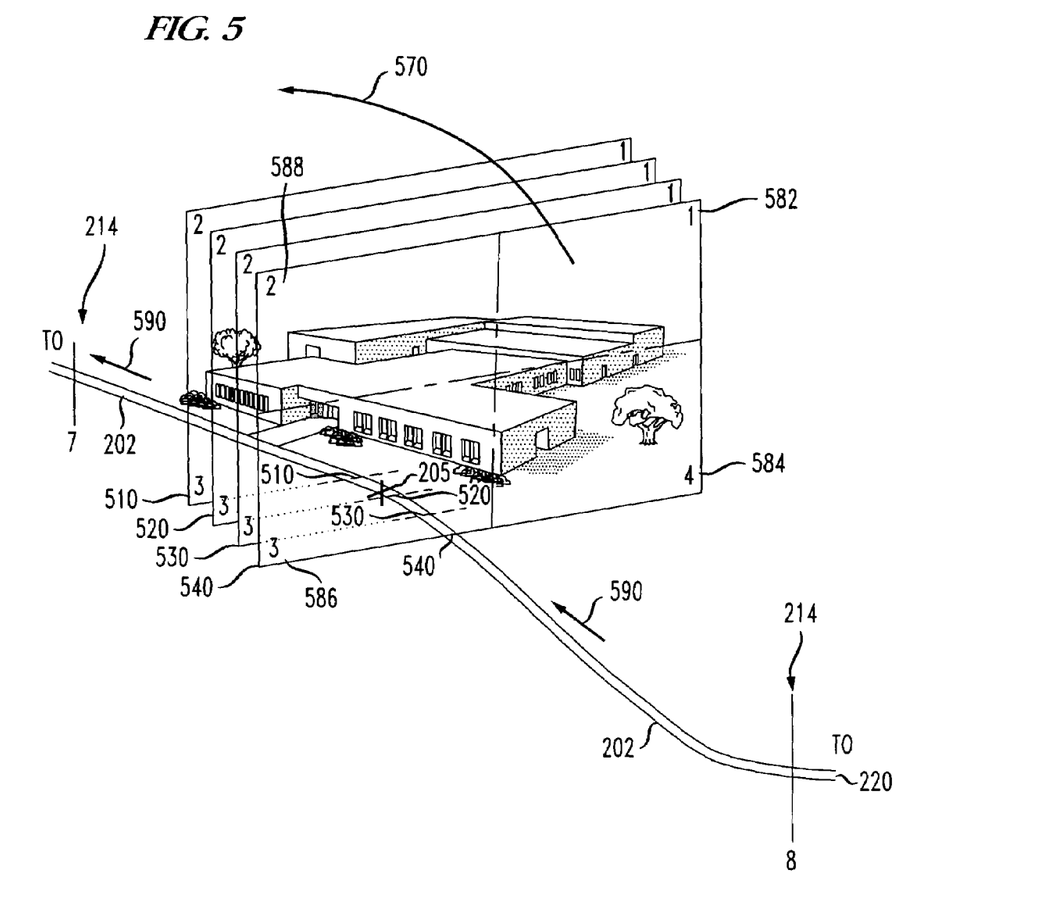
FIG. 5 illustrates the frames and sub-frames used to create the display in the vicinity of the cable break.

In FIG. 5, a resulting series of frames 510–540 are shown depicting a portion of the display compiled by controller 112 in accordance with the present invention and as requested by the dispatcher. In the direction of travel 590, a fly-by view 570 of the surroundings along the optical cable's path is shown. Frames 510, 520, 530 and 540 are selected frames partitioned into 4 sub-frames 1, 2, 3, and respectively referenced as 582, 584,586, and 588. These frames 510–540 were selected in accordance with the chosen significance level, the display algorithm for selecting a frame or an overlay of a sub-frame to a current reference frame and the other display parameters chosen as shown in FIG. 4. As the display is shown on the dispatch terminal 110, the sequence of selected frames and sub-frames are presented in accordance with the frame delay time. Sequentially, frames 540, 530, 520, and 510 are displayed with intervening displays of sub-frames overlaid on a frame in the event that sub-frame selection option has been enabled. As is readily apparent, sub-frames 3 in each of the shown selected frames appear to be of immediate importance in as much as sub-frame 3 captures the area of particular interest to the dispatcher. Sub-frame 3 captures the area of the cable break or failure 205 and provides the dispatcher with the knowledge that the cable break or failure 205 has occurred in front of an office complex, which may present certain jurisdictional issues with the office complex and may require the cooperation and coordination with the businesses operating there. Having assessed and viewed the surroundings captured by the fly-by view of the site of the break, the dispatcher issues a request for the FMS 106 to generate and forward a work order to the controller 112 for issuance to field personnel. Because of the advance viewing of the site of the cable break or failure 205, the dispatcher is able to contact the office complex and to issue specific instructions in the work order, consistent with the repair methods and time schedules discussed with businesses potentially affected by the cable break.

The foregoing description of an embodiment of the present invention should be considered as illustrative and not as limiting. The disclosed variations in the map file generation and processing system and methods of displaying the frames are indicative of the many possible embodiments to the present invention. Various other changes and modifications will occur to those skilled in the art for accomplishing the same result and for operating in substantially the same way without departing from the true scope of the invention as defined in the claims appended hereto.

What is claimed is:

1. A method of providing a display of a site in a network management system, comprising:
    segmenting a cable and assigning positioning markers along a length of the cable for identifying sections of the cable and cable components;
    storing in a database a series of display frames;
    assigning each display frame to a positioning marker, each frame graphically descriptive of surroundings within an immediate vicinity of the assigned positioning marker;
    automatically displaying a notice indicative of an automatically detected cable break and an associated two-dimensional map of a suspected site of the cable break, the suspected site of the cable break automatically located via an algorithm based on historical reliability of measurements taken from a specific test point;
    automatically generating a trouble ticket responsive to the automatically detected cable break;
    assigning a relative significance level to each frame based upon the notice indicative of the cable break;
    selecting a set of frames based on the relative significance level from the series of display frames along the length of the cable related to the suspected site of the cable break; and
    displaying in sequence the selected set of frames related to the suspected site of the cable break.

2. The method of claim 1, wherein the step of selecting the set of frames comprises using a first frame as a reference and comparing the significance level of the first frame to the significance level of a sequentially proximate second frame, and selecting the second frame for display if the significance level of the second frame is at least equal to a predetermined significance level.

3. The method of claim 1, further comprising the step of correlating the positioning markers with a relative distance from a predetermined point of origin.

4. The method of claim 1, further comprising the step of transmitting a test signal along the length of the cable to locate a point of failure, correlating the point of failure with an associated positioning marker, and retrieving the selected set of frames within a vicinity of the associated positioning marker.

5. The method of claim 1, further comprising the step of retrieving the set of display frames along the length of the cable and within a vicinity of a point of failure.

6. The method of claim 1, wherein the step of selecting the set of frames comprises using a first frame as a reference and comparing the significance level of the first frame to the significance level of a sequentially proximate second frame, and rejecting the second frame for display if the significance level of the second frame is less than a first predetermined significance level, and then comparing the significance level of the first frame to the significance level of a sequentially proximate third frame, and selecting the third frame for display if the significance level of the third frame and the significance level of the rejected second frame are cumulatively at least equal to a second predetermined significance level.

7. The method of claim 1, further comprising the step of converting the positioning markers into internal map-based geocodes for selecting one or more frames.

8. The system of claim 7, further comprising the step of requesting the two dimensional map based on the converted geocodes.

9. A method of providing a display of a site in a network management system, comprising:
    segmenting a cable and assigning positioning markers along a length of the cable for identifying sections of the cable and cable components;
    storing in a database a series of display frames;

assigning each display frame to a positioning marker, each frame graphically descriptive of surroundings within an immediate vicinity of the assigned positioning marker;
automatically displaying a notice indicative of an automatically detected cable break and an associated two-dimensional map of a suspected site of the cable break, the suspected site of the cable break automatically located via an algorithm based on historical reliability of measurements taken from a specific test point;
automatically generating a trouble ticket responsive to the automatically detected cable break;
assigning one relative significance level to each frame based upon the notice indicative of the cable break;
partitioning each frame into two or more sub-frames;
assigning one relative significance level to each sub-frame of each frame;
selecting a set of frames and sub-frames from a set of frames based on the relative significance level assigned to each of the frames and sub-frames from the series of display frames along the length of the cable related to the suspected site of the cable break; and
displaying in sequence the selected set of frames and sub-frames related to the suspected site of the cable break.

10. The method of claim 9, wherein the step of selecting the set of frames and sub-frames comprises using a first frame as a reference and comparing the significance level of the first frame to the significance level of a sequentially proximate second frame, and selecting the second frame for display if the significance level of the second frame is at least equal to a predetermined significance level.

11. The method of claim 9, wherein the step of selecting a set of frames and sub-frames comprises using a first frame partitioned into two or more sub-frames as a reference and comparing the significance level of a sub-frame in the first frame to the corresponding significance level of a sequentially proximate and corresponding sub-frame in a second frame, and selecting the corresponding sub-frame in the second frame for display if the significance level of the corresponding sub-frame in the second frame is at least equal to a predetermined significance level.

12. The method of claim 9, further comprising the step of correlating the positioning markers with a relative distance from a predetermined point of origin.

13. The method of claim 9, further comprising the step of transmitting a test signal along the length of the cable to locate a point of failure, correlating the point of failure with an associated positioning marker, and retrieving a set of display frames within a vicinity of the associated positioning marker.

14. The method of claim 9, further comprising the step of transmitting two or more test signals along the length of the cable from two different points of origin to locate a point of failure, correlating the point of failure by averaging resulting positioning data from the two different points of origin and associating the positioning data with a particular positioning marker, and retrieving the set of frames within a vicinity of the particular positioning marker.

15. The method of claim 9, further comprising the step of retrieving the set of frames along the length of the cable and within a vicinity of a point of failure.

16. The method of claim 9, wherein the step of selecting the set of frames and sub-frames comprises using a first frame as a reference and comparing the significance level of the first frame to the significance level of a sequentially proximate second frame, and rejecting the second frame for display if the significance level of the second frame is less than a first predetermined significance level, and then comparing the significance level of the first frame to the significance level of a sequentially proximate third frame, and selecting the third frame for display if the significance level of the third frame and the significance level of the rejected second frame are cumulatively at least equal to a second predetermined significance level.

17. The method of claim 9, wherein the step of selecting the set of frames and sub-frames comprises using a first frame partitioned into two or more sub-frames as a reference and comparing the significance level of a sub-frame in the first frame to the significance level of a sequentially proximate and corresponding sub-frame in a second frame, and rejecting the corresponding sub-frame in the second frame for display if the significance level of the corresponding sub-frame in the second frame is at less than a first predetermined significance level, and then comparing the significance level of the sub-frame in the first frame to the significance level of a sequentially proximate and corresponding sub-frame in a third frame, and selecting the corresponding sub-frame in the third frame for display if the significance level of the corresponding sub-frame in the third frame and the significance level of the rejected corresponding sub-frame in the second frame are cumulatively at least equal to a second predetermined significance level.

18. The method of claim 9, further comprising the step of converting the positioning markers into internal map-based geocodes for selecting one or more frames.

19. The system of claim 18, further comprising the step of requesting the two dimensional map based on the converted geocodes.

20. A system for providing a display of a site in a network management system, comprising:
a facilities management processor adapted to receive cable failure notifications and adapted to process display requests of a site within an immediate vicinity of a cable failure, the facilities management processor adapted to automatically generate a trouble ticket responsive to the automatically detected cable break;
a controller in communication with the facilities management processor adapted to select and compile a series of display frames; and
a map server in communication with the controller adapted to store, process, and forward requested mapping information and display frames associated with the immediate vicinity of the cable failure, the controller operative for selecting a set of frames in which a first frame is used as a reference and a comparison is conducted between a significance level of the first frame to a significance level of a sequentially proximate second frame, and the controller selects the second frame for display if the significance level of the second frame is at least equal to a predetermined significance level, the man server adapted to cause, responsive to a displayed notice of a cable break, a display of an associated two-dimensional map of a suspected site of the cable break, the suspected site of the cable break automatically located via an algorithm based on historical reliability of measurements taken from a specific test point.

21. The system of claim 20, wherein the facilities management processor transmits a first test signal from a terminating site along a length of a portion of a cable to locate a point of failure, and correlates the point of failure with a positioning marker which designates a relative position of cable failure.

22. The system of claim 21, wherein the facilities management processor forwards positioning data to the controller, and wherein the controller converts the positioning data into internal map-based geocodes for selecting one or more frames.

23. The system of claim 22, wherein the facilities management processor receives positioning data and queries the controller for the two dimensional map, and wherein the controller forwards the two-dimensional map to the facilities management processor based on the converted geocodes.

24. The system of claim 23, wherein the controller compiles the series of frames in accordance with the predetermined significance level.

25. The system of claim 24, wherein the facilities management processor transmits a second test signal from an in-network test point and compares an in-network test signal response and a response to the first test signal to determine a location of the point of failure.

26. The system of claim 25, further comprising a means for wirelessly transmitting the series of display frames to a display device.

27. The system of claim 26, wherein the facilities management processor comprises a database which correlates segments and sub-segments of a cable with distances from a point of origin.

28. The system of claim 27, wherein the controller selects the set of frames for display on a terminal by using the first frame as the reference and comparing the significance level of the first frame to the significance level of the sequentially proximate second frame, and selecting the second frame for display if the significance level of the second frame is at least equal to the determined significance level.

29. The system 28, wherein the controller selects a set of sub-frames for display on a terminal by using the first frame, partitioned into two or more sub-frames, as the reference and comparing the significance level of a sub-frame in the first frame to a corresponding significance level of a sequentially proximate and corresponding sub-frame in the second frame, and selecting the corresponding sub-frame in the second frame for display if the significance level of the corresponding sub-frame in the second frame is at least equal to the predetermined significance level.

* * * * *